United States Patent Office 3,495,399
Patented Feb. 17, 1970

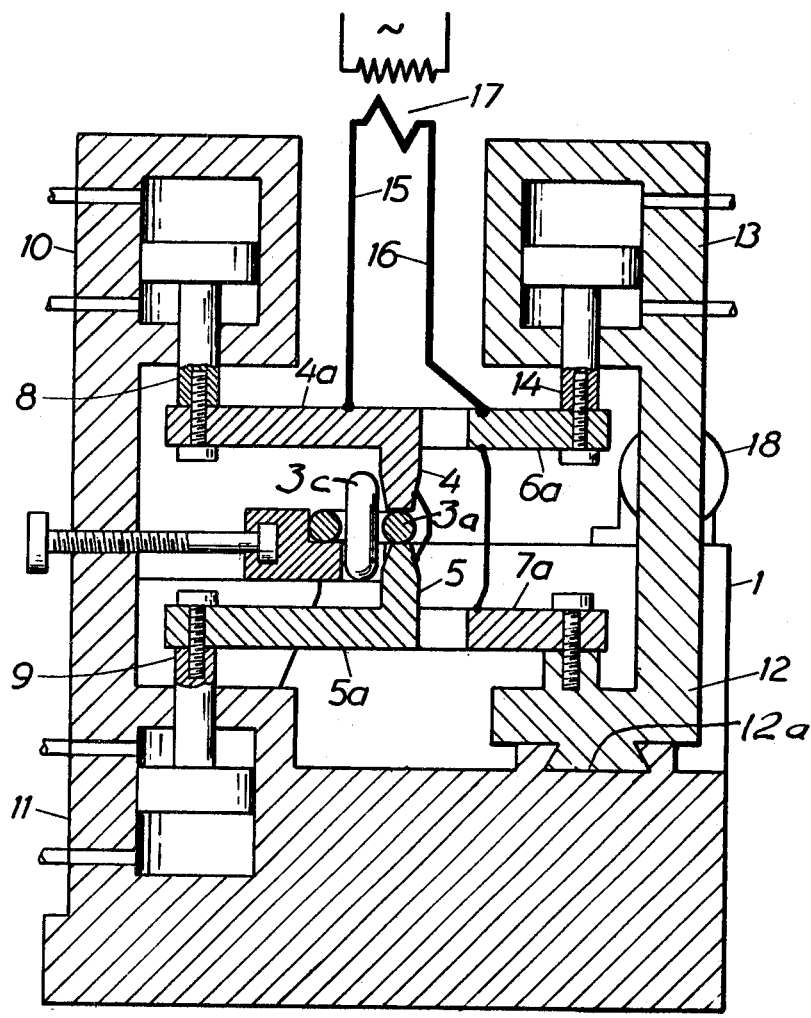

3,495,399
APPARATUS FOR WELDING A CHAIN LINK
Gosta Vilhelm Isidor Johansson, Laxa, and Egon Gote Alf Wehlin, Huddinge, Sweden, assignors to Elektriska Svetsningsaktiebolaget, Goteborg, Sweden, a corporation of Sweden
Filed May 9, 1968, Ser. No. 727,974
Claims priority, application Sweden, May 10, 1967, 6,524/67
Int. Cl. B21l 3/02
U.S. Cl. 59—31                              2 Claims

ABSTRACT OF THE DISCLOSURE

A chain link welding machine having two pairs of hydraulically actuated clamping members adapted each to clamp one of the link end portions to be joined. Means are provided for movably supportilng one of the pairs of clamping members for movement relative to the other pair, and means are provided for exerting such movement to submit the joint to an upsetting action.

---

This invention relates to apparatus for the resistance welding of chain links of the single joint type. More particularly, the invention relates to chain welding apparatus of the type comprising a frame, two pairs of clamping members adapted each to clamp one of the link end portions to be joined, a hydraulic actuating unit for each of said pairs of clamping members, each of said units comprising at least one hydraulic cylinder for making the pair of clamping members grip the link end portion, the axis of said at least one cylinder of one actuating unit being parallel to the axis of said at least one cylinder of the other actuating unit, movable means for supporting at least one of said pairs of clamping members and its hydraulic actuating unit, guiding means in said frame for guiding said movable means in a path substantially parallel to the axis of the joint, and means for exerting a force on said movable means so as to submit the joint to an upsetting action.

In existing apparatus of this type, the two hydraulic units actuating the respective pairs of clamping members are placed at the same side of the chain behind each other along the chain. Consequently, the hydraulic units together take up a considerable space lengthwise of the chain. This results in certain problems regarding the trimming of the links, that is, the removal of the fin or bulge of excess material formed around the joint during the welding operation. It is usually preferable to carry out the trimming operation while the weld is still in the red-hot state. One way of doing this is to effect the trimming operation while the link is still clamped in the welding station. This method, however, results in a reduction of the production capacity of the machine. A better way is to provide a separate trimming station disposed immediately behind the welding station so that the link just welded is advanced to the trimming station at the same time as the next link in turn to be welded is advanced to the welding station. With the arrangement of the hydraulic units above referred to, it is, however, difficult to dispose the trimming station sufficiently near the welding station, the anterior one of the hydraulic actuating units being in the way. Various ways of getting around this difficulty have been suggested. For instance, it has been proposed to economize on space by adapting the anterior one of the hydraulic units (with regard to the direction of advancement of the chain) to actuate not only one of the pairs of clamping members of the welding station but also a pair of clamping members of the trimming station. The space to be gained by this expedient is, however, necessarily limited; there is also the disadvantage that adjustment of the machine to different link sizes will be difficult or impossible.

According to a principal feature of the invention, the hydraulic actuating units are disposed at opposite sides of a symmetry plane of a chain link held by the clamping members, said symmetry plane extending parallelly to the axis of the joint and at right angles to the plane of the link, and are disposed substantially on a level with each other in the direction defined by the axis of the joint.

The expression "substantially on a level with each other" should be understood to indicate that the projection of the axis of one actuating unit on said symmetry plane either substantially coincides with the projection of the axis of the other actuating unit on said plane or is separated therefrom by a distance not exceeding the centre-to-centre distance between the pairs of clamping members.

In the arrangement according to the invention, the hydraulic actuating units take up a minimum of space lengthwise of the chain. Consequently, the disposing of a trimming station at the required small distance from the welding station no longer presents any difficulties.

The invention is illustrated by way of example in the accompanying drawings, in which:

FIG. 2 is a sectional view taken along the line II—II of FIG. 1.

Figure 1:
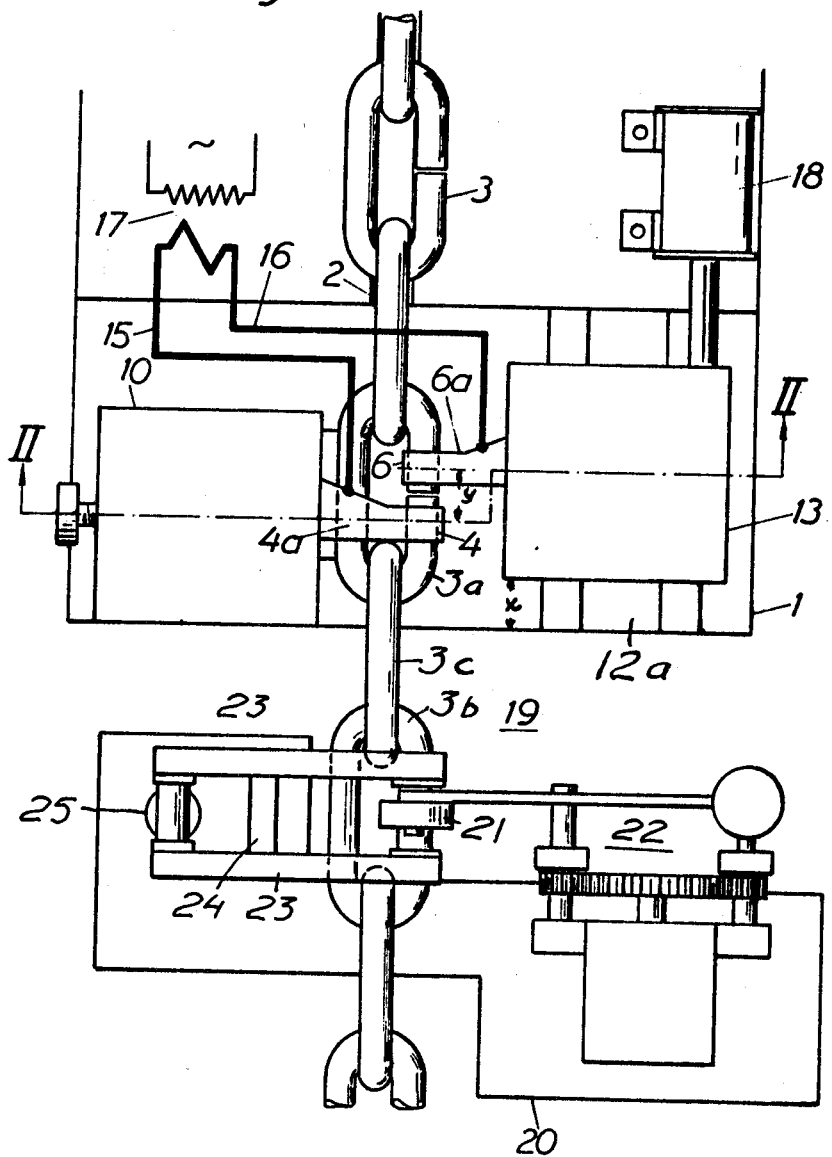
FIG. 1 is a plan view of a welding apparatus according to the invention.

The drawings are somewhat schematical and do not include details which are not material to the understanding of the invention.

The chain welding apparatus shown is supported by a frame or body 1 provided with the usual guiding groove 2 for guiding a chain 3 composed of pre-bent links. The link 3a in the welding station of the apparatus is clamped by two pairs of clamping members 4–5 and 6–7. Each of the clamping members 4, 5 is provided with a stem portion 4a, 5a attached to the piston rod 8, 9, respectively, of a hydraulic cylinder 10, 11, said cylinders constituting a hydraulic actuating unit for the pair of clamping members 4, 5. The lower clamping member 7 (not visible) of the other pair of clamping members is attached by its stem portion 7a to a carriage 12 displaceable along a guide groove 12a extending parallelly to the groove 2. The carriage also supports a hydraulic cylinder 13 to the piston rod 14 of which the stem portion 6a of the upper clamping member 6 is attached. The pairs of clamping members 4–5 and 6–7 also constitute electrodes for the supply of welding current to the end portions of the chain link, each of said pairs of clamping members being connected by means of a conductor 15, 16 to one terminal of the secondary of a welding transformer 17. The carriage 12 is operated by a hydraulic cylinder 18, by means of which the link end portion clamped between the clamping members 6, 7 can be urged against the other link end portion clamped between the clamping members 4, 5.

The means (not shown) for controlling the supply of a hydraulic fluid to the aforesaid hydraulic cylinders are conventional and need no description.

In the embodiment described, the hydraulic unit actuating one pair of clamping members 4, 5 comprises two hydraulic cylinders 10, 11 arranged in alignment with each other, while the hydraulic unit actuating the other pair of clamping members 6, 7 comprises one single hydraulic cylinder 13. According to the invention, said hydraulic actuating units are disposed at opposite sides of a symmetry plane of the chain link 3a held by the clamping members, said plane extending parallelly to the axis of the joint and at right angles to the plane of the link, and disposed substantially on a level with (alongside) each other with regard to the direction defined by the axis of the joint. In the example shown, the hydraulic actuating units are offset in said direction by an amount $x$ approximately equal to the centre-to-centre distance $y$ between the pairs of clamping members 4–5 and 6–7. Thus, the overall length of the hydraulic cylinders 10, 11, 13 lengthwise of the chain only slightly exceeds the size of a single cylinder. There is, therefore, ample room behind the welding station for a trimming station 19 adapted to receive a link 3b connected by only one intermediate link 3c to the link 3a held in the welding station.

The trimming device 19, which is of the type described in the British patent specification No. 883,261, comprises a trimming tool 21 actuated by mechanism 22 which forms no part of the present invention and need not be described in the present context. A pair of clamping levers 23 for holding the link 3b during the trimming operation are pivotally supported at 24 by the frame 20 of the trimming device and actuated at their outer extremity by hydraulic means 25. The trimming operation in the trimming station is carried out simultaneously with the welding operation in the welding station. Conventional advancing means not shown in the drawing are actuated on completion of said operations to move the chain forward by one step so as to shift the link 3a from the welding station to the trimming station at the same time as the next link to be welded is moved to the welding position. The frame 20 of the trimming device and the frame 1 of the welding apparatus may be parts of a common structure. Preferably, however, the frame 20 is adjustable longitudinally of the chain in order to adapt the apparatus to different chain link lengths.

We claim:

1. Apparatus for the resistance welding of chain links of the single joint type, comprising a frame, two pairs of clamping members adapted each to clamp one of the link end portions to be joined, a hydraulic actuating unit for each of said pairs of clamping members, each of said units comprising at least one hydraulic cylinder for making the clamping members of the pair grip the link end portion, the axis of said at least one cylinder of one unit being parallel to the axis of the at least one cylinder of the other unit, movable means for supporting at least one of said pairs of clamping members and its hydraulic actuating unit, guiding means in said frame for guiding said movable means in a path substantially parallel to the common axis of the link end portions clamped by said pairs of clamping members, and means for exerting a force on said movable means so as to submit the joint to an upsetting action, in which the hydraulic actuating units are placed at opposite sides of a symmetry plane of a chain link held by said clamping members, said plane extending parallel to the axis of the joint and at right angles to the plane of the link, and said actuating units being disposed substantially on a level with each other with regard to the direction defined by the axis of the joint.

2. Apparatus as claimed in claim 1 which further comprises a weld trimming device disposed behind the welding apparatus, clamping means for holding a chain link connected by only one intermediate link to the one clamped by the clamping members of the welding apparatus, and power means for actuating said clamping means.

References Cited

UNITED STATES PATENTS 3,389,552  6/1968  Kleine-Weischede _____ 59—29

FOREIGN PATENTS 1,442,047  5/1966  France.

CHARLES W. LANHAM, Primary Examiner

G. P. CROSBY, Assistant Examiner

U.S. Cl. X.R.

59—34